US006430406B1

United States Patent
Frisk

(10) Patent No.: US 6,430,406 B1
(45) Date of Patent: Aug. 6, 2002

(54) CREDIT INFORMATION IN A MOBILE PHONE

(75) Inventor: Kristian Frisk, Frederiksberg (DK)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/506,500

(22) Filed: Feb. 17, 2000

(30) Foreign Application Priority Data

Feb. 19, 1999 (GB) .............................................. 9903877

(51) Int. Cl.[7] .............................. H04Q 7/20; H04Q 7/32
(52) U.S. Cl. ....................... 455/407; 455/405; 455/406; 455/408; 379/114.01; 379/114.15; 379/114.2; 379/127.05; 379/114.16
(58) Field of Search ................................ 455/407, 406, 455/408, 409, 414, 422, 403, 424, 425, 412, 550, 552, 558, 517, 405; 379/114.01, 114.15, 122, 114.2, 127.05, 144.08, 114.16

(56) References Cited

U.S. PATENT DOCUMENTS

| 4,777,646 A | * | 10/1988 | Harris ......................... 455/407 |
| 6,088,431 A | * | 7/2000 | Ladue ......................... 455/405 |
| 6,108,531 A | * | 8/2000 | Berg et al. .................. 455/408 |
| 6,198,915 B1 | * | 3/2001 | McGregor et al. .......... 455/406 |

FOREIGN PATENT DOCUMENTS

| EP | 0698987 A2 | 2/1996 |
| GB | 2265522 | 9/1993 |

OTHER PUBLICATIONS

"Smart Messaging Specification", Nokia Mobile Phones, Ltd., Revision 1.0.0; Sep. 15, 1997, available on the Internet address URL: www.forum.nokia.com/nf/concepts/smart/main.html.

"Narrow–Band Sockets Specification", Intel Corporation, Nokia Telecommunications, Revision 1.0, Mar. 7, 1997, available on the Internet address URL: www.forum.nokia.com/nf/concepts/smart/main.html.

* cited by examiner

Primary Examiner—William Trost
Assistant Examiner—Keith Ferguson
(74) Attorney, Agent, or Firm—Perman & Green, LLP

(57) ABSTRACT

A portable prepaid phone has a display, input means for inputting information and instructions, a control unit controlling the display in dependence on the operation of the input means, and transceiver means communicating via a wireless network controlled by a network operator. The network operator manages an account for said phone and updates the account upon the occurrence of a credit-affecting event. The network operator forwards a credit update message to portable prepaid phone and said message contains information about the current account and the credit affecting event causing the message to be sent to the phone upon the occurrence of a credit affecting event. In the phone the transceiver means receives the credit update message, the control unit decodes the received message in order to identify the content of the credit update message, and the control unit initiates the display of the current account in the display, immediately after the termination of the credit update message decoding.

22 Claims, 4 Drawing Sheets

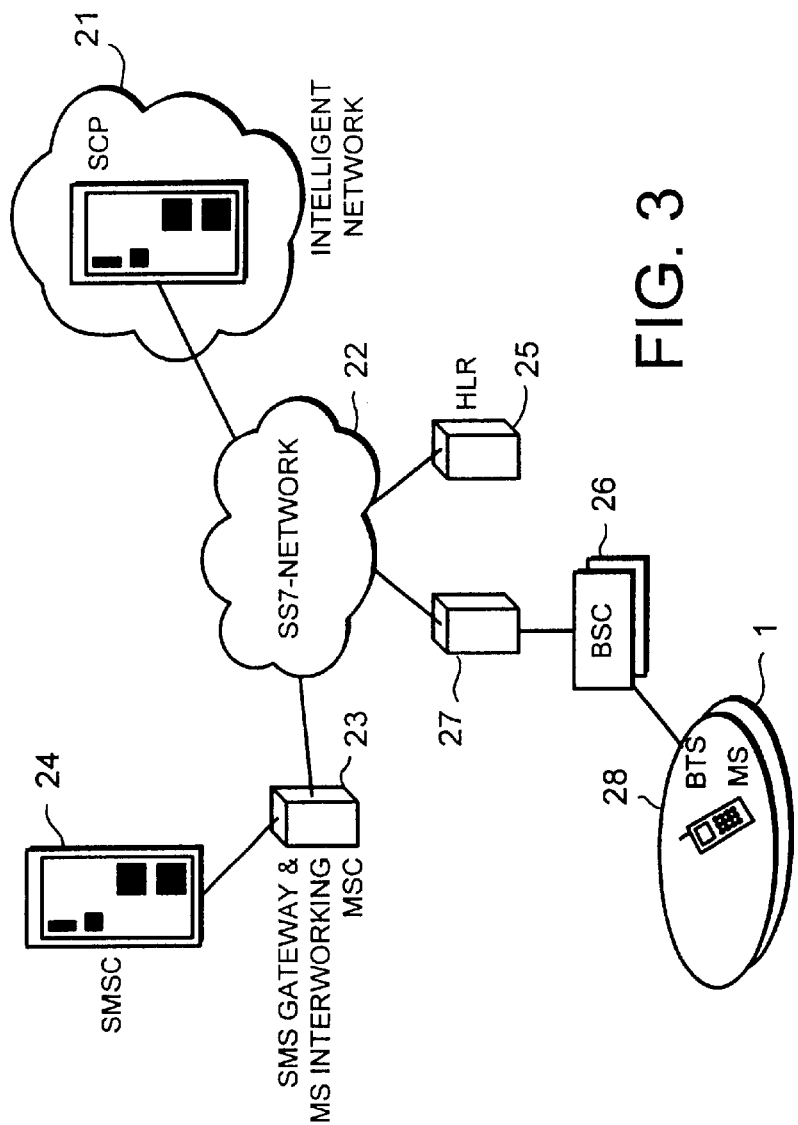

CREDIT INFORMATION IN A MOBILE PHONE

TECHNICAL FIELD OF THE INVENTION

The invention relates to prepaid phones. The operator has a database of accounts handling the credit of the respective phones. The user will be able to use the phone as long as the associated account shows a positive credit level. However the user may recharge the account by phone banking or by buying recharge cards and transferring the associated code to the network operator.

BACKGROUND OF THE INVENTION

The user has a possibility to check the credit level of his account by calling an interactive voice responder. The voice responder is free of charge and the network operator therefore loses free air time. Experience has shown that this loss will be in the level of one third of the total airtime. In order to get rid of this non-chargeable free air time it has been requested to design a network that transmits a credit update message immediately after the occurrence of a credit affecting event.

SUMMARY OF THE INVENTION

An object of the invention is to provide a portable prepaid phone being able to receive a credit update message from a network operator being forwarded upon the occurrence of a credit affecting event, said credit update message contains information about the current account and the credit affecting event causing the message to be sent, and to inform the user about the event.

This purpose is obtained by a portable prepaid phone having a display, input means for inputting information and instructions, a control unit controlling the display in dependence on the operation of the input means, and transceiver means communicating via a wireless network controlled by a network operator, said network operator manages an account for said phone and updates the account upon the occurrence of a credit affecting event, and said network operator forwards a credit update message to portable prepaid phone and said message contains information about the current account and the credit affecting event causing the message to be send to the phone upon the occurrence of a credit affecting event, wherein the transceiver means of the portable prepaid phone receives the credit update message, the control unit decodes the received message in order to identify the content of the credit update message, and control unit initiates the display of the current account in the display, immediately after the termination of the credit update message decoding. Hereby the user will be able to get the information by using a simple SMS transmitted to the phone. First of all bandwidth is saved and secondly phone will be able to store the information.

Preferably the control unit displays the credit information for a predetermined period of time—e.g 3–5 seconds. During this period the control unit may advantageously disable the input means. Advantageously an alert signal may be given by the alert signal means (e.g. a buzzer or a vibrator) in order to inform the user when certain events have occurred.

Preferably the processor stores all credit information received in credit information messages in a log file. This log file may have a limited maximum size, and when this size is reached a new entry will replace the oldest one. The user may be allowed to transfer the content of the log file to e.g. a PC by means of an IR link.

BRIEF DESCRIPTION OF THE DRAWING

FIG. 3 shows a preferred embodiment of system architecture according to the invention.

FIG. 4 illustrates a preferred embodiment of the credit information message according to the invention.

DETAILED DESCRIPTION OF EMBODIMENTS

Figure 1:
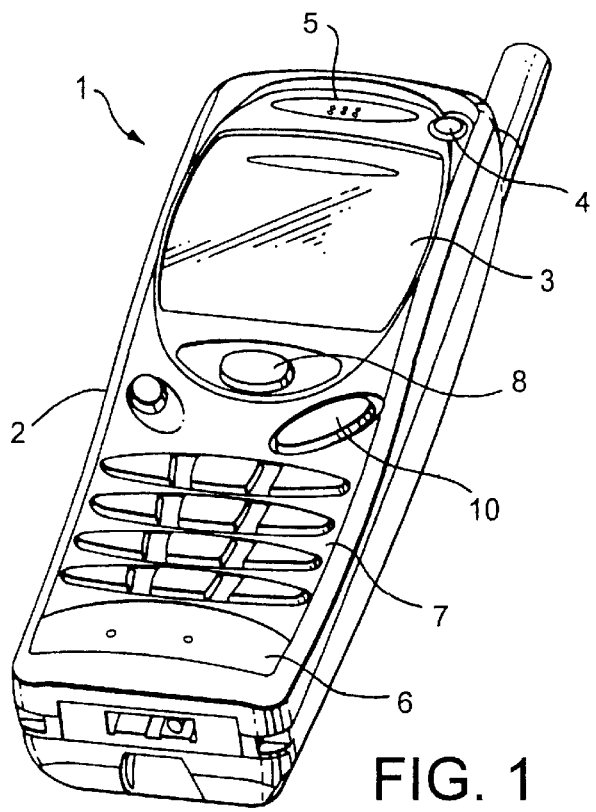
FIG. 1 schematically illustrates a preferred embodiment of a hand portable phone according to the invention.

FIG. 1 shows a preferred embodiment of a phone according to the invention, and it will be seen that the phone, which is generally designated by 1, comprises a user interface having a keypad 2, a display 3, an on/off button 4, a speaker 5, and a microphone 6 (only openings are shown). The phone 1 according to the preferred embodiment is adapted for communication via a cellular network, but could have been designed for a cordless network as well.

According to the preferred embodiment the keypad 2 has a first group 7 of keys as alphanumeric keys, a soft key 8, and a navigation key 10. Furthermore the keypad includes a "clear" key 9. The present functionality of the soft key 8 is shown in separate fields in the display 3 just above the key 8. This key lay out is a characteristic of the Nokia 3110™ phone and the Nokia 5110™ phone.

Figure 2:
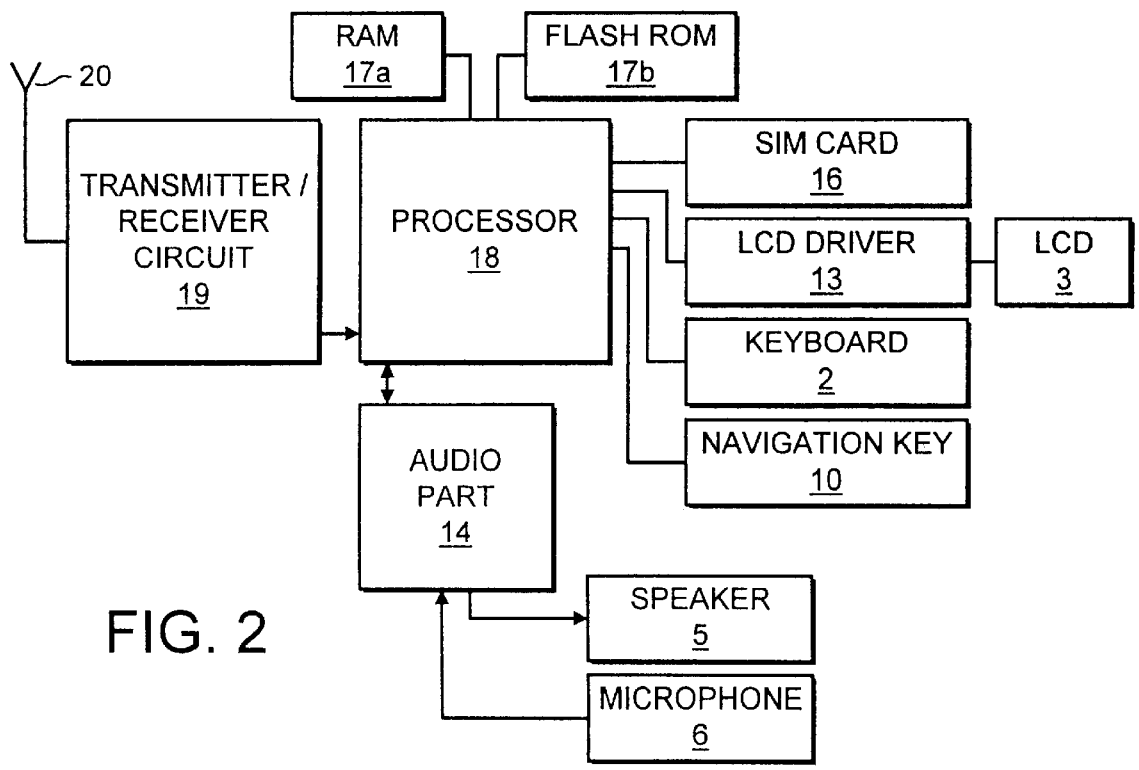
FIG. 2 schematically shows the essential parts of a telephone for communication with a cellular or cordless network.

FIG. 2 schematically shows the most important parts of a preferred embodiment of the phone, said parts being essential to the understanding of the invention. The preferred embodiment of the phone of the invention is adapted for use in connection with the GSM 900 MHz and GSM 1800 MHz network, but, of course, the invention may also be applied in connection with other phone networks. The processor 18 controls the communication with the network via the transmitter/receiver circuit 19 and an antenna 20 that will be discussed in details below.

The microphone 6 transforms the user's speech into the analog signals formed thereby are A/D converted in an A/D converter (not shown) before the speech is encoded in an audio part 14. The encoded speech signal is transferred to the processor 18, which i.a. supports the GSM terminal software. The processor 18 also forms the interface to the peripheral units of the apparatus, including a RAM memory 17a and a Flash ROM memory 17b, a SIM card 16, the display 3 and the keypad 2 (as well as data, power supply, etc.). The audio part 14 speech-decodes the signal, which is transferred from the processor 18 to the earpiece 5 via a D/A converter (not shown).

The preferred messaging concept.

According to the preferred embodiment this information is handled by the Smart Messaging Concept. This concept was disclosed by the applicant at the Cebit fair in Mar. 1997 (Press release Mar. 20, 1997) and discussed in details the document: "Smart Messaging Specification", Revision 1.0.0; September being available on the Internet address URL: www.forum.nokia.com/nf/concepts/smart/main.html. From this Internet address another document "Narrow-Band Sockets Specification", Revision 1.0, Mar. 7, 1997 may be downloaded. This document describes the Narrow-Band Socket (developed by a joint effort by of Intel and Nokia) that enables applications to access various network data bearer services using a standard socket interface.

The system architecture.

A preferred embodiment of the system architecture for managing the credit system is shown in FIG. 3. A Service Control Point 21 (SCP) in a so-called Intelligent Network (IN) contains credit information and a credit application for handling the credit of prepaid cards for cellular phones. A Home Location Register 25 (HLR) is a database including relevant subscriber information for the provision of the telecommunication service. An SS7 Network 22 is a CCITT specified network interconnecting the individual parts of the system. A SMS gateway & SMS interworking Mobile Switching Center (MSC) 23 is a switching unit routing a message or a call towards a Mobile Station (the phone 1). A Short Message Service Center 24 (SMSC) and a SMS gateway & SMS interworking Mobile Switching Center (MSC) 23 handles and routes the SMS's between the SMSC 24 and the SS7 Network 22. From the SS7 Network 22 the messages are routed towards the Mobile Station 1 via a Mobile Switching Center (MSC) 27, and a Base Station Processor 26 (BSC). A Base Transceiver Station (BTS) 28 establishes the air connection towards the Mobile Station 1.

This credit information is sent to the cellular phones when a predetermined event occurs. This is done by using the Smart Messaging concept. The short message's route is that the credit information is transmitted from the Service Control Point 21 via the SMS gateway 23 to the Short Message Service Center 24 where the message is generated in the correct format. From the Short Message Service Center 24 the message is routed via SMS interworking Mobile Switching Center (MSC) 23, the Mobile Switching Center (MSC) 27, the Base Station Processor 26 (BSC), the Base Transceiver Station (BTS) 28 before finally being received in the Mobile Station 1.

The credit information message.

The format of the credit information message transmitted to the phone according to the preferred embodiment is illustrated in FIG. 4. The message format is based on the Nokia/Intel Narrow Band Socket (NBS) specification. This format is already well known and used for a number of services already implemented in a wide range of Nokia products, e.g. Over The Air (OTA) business cards, OTA ringing tone download etc.

Basically a smart message 30 consists of a NBS header 31 and a message body 32–39 where the data is located. Preferably text based headers are used as in the existing Nokia OTA features. This header format will furthermore be compatible with the Wireless Application Protocol (WAP) according to the Wireless Datagram Protocol Specification, Version Apr. 30, 1998, available through the Wireless Application Forum Ltd.

The message 30 starts with the characters "//SCKL" identifying the NBS datagram addressing scheme to the receiving device (the phone 1) these characters are followed by the destination port (hexadecimal) that identifies the message type, e.g. //SCKL1583 (CLI logo download). A unique port address starting with "//SCKL" and followed by a predetermined or assigned four digit hexadecimal code is assigned for the credit information service. The phone 1 recognizes the address in the message header 31 the phone 1 deems the message 30 to contain credit information and handles the message accordingly.

The message body consists of a plurality of data fields 32–39 separated by line feed character. The first field 32 indicates the type of event that caused the message. The event types include:

Periodically update upon call (update).

Initial update when the phone 1 is switched on / access network.

Warning when the subscriber credit is below a predetermined limit (low credit).

Warning when the subscriber credit runs out (no credit).

Acknowledgement of recharged credit (recharge info).

Response of a user request (requested up date).

Information caused by charging the credit information service (credit information charge).

The message 30 does furthermore include a data field 32 identifying the date and time the short message were sent to the phone 1, a data field 33 giving the phone 1 information about the current credit and a data field 34 containing information about the currency unit. Finally the message includes four data fields 36–39 containing information or being empty in dependence of the event. The first one 36 of these data fields contains information about the last call price and the second one 37 of these data fields contains information about the service charging price when a special service has been requested. The two last data fields 38 and 39 include information about the recharge time and the recharge amount, respectively.

Figure 5:
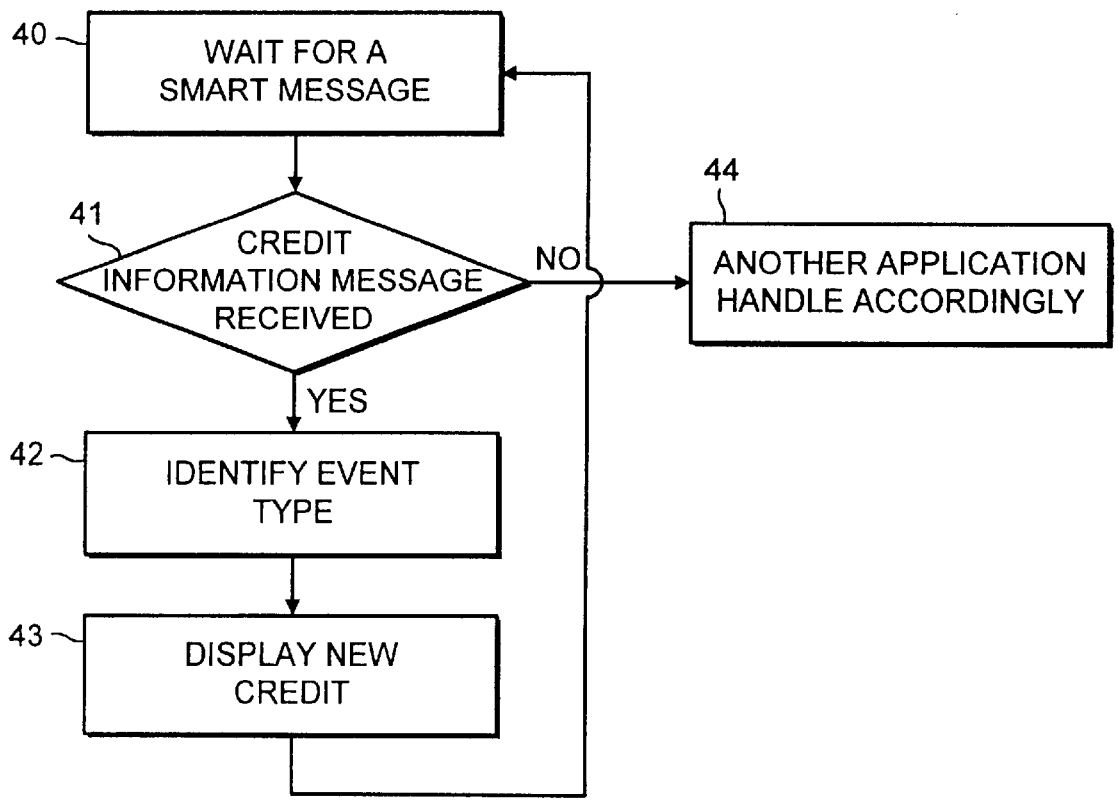
FIG. 5 shows a flowchart in which the phone monitors whether a credit information message has been received.

FIG. 5 shows a flowchart in which the phone 1 in step 40 monitors whether a smart message has been received. When a smart message is received the processor 18 of the phone 1 checks the address part of the message in step 41 and if the processor 18 recognizes the message as being a credit information message, the processor 18 starts to look in the message header 31 in order to identify the event that caused the transmission of the message. If the message is not recognized as a credit information message the processor starts to identify the type in step 44 and to handle the message according to this.

When the processor 18 has identified the type of the event in step 42 it finds the current credit in data field 34 and displays the updated credit info in the display 3 of the phone 1. The full credit information from the message is stored in a log file in the RAM memory 17a.

When the network detects the event, e.g. a termination, it initializes the transmission of a smart message via the SMSC 24. Therefore the user will receive the current credit information shortly after the event has happened. The current credit information can therefore be regarded as a pseudo real time indication.

According to the preferred embodiment the display of the credit information is accompanied by an alert signal (a beep) and the information remains in the display for a while (e.g. during a 5 sec. time out).

Different scenarios.

Figure 6:
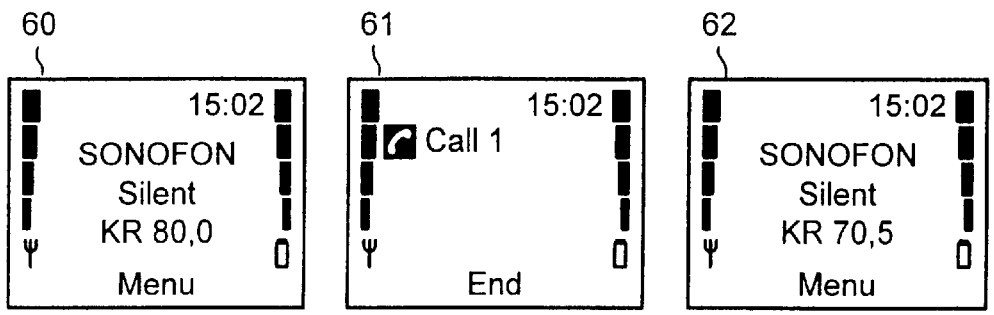
FIG. 6 shows three images illustrating a "call" scenario of the prepaid credit displayed according to the invention.

When the pre-paid phone is switched on the current credit, "KR 80,0" (80.00 Danish kroner) is displayed in the idle mode display as shown in the display 60 in FIG. 6. The phone furthermore shows the clock "15:02", the name of the operator "SONOFON", that silent mode of the phone has been selected, and that the present functionality of the soft key 8 is "Menu". The display 61 illustrates that a call is ongoing and that the soft key functionality is "End" (terminate call). The phone 1 receives a credit information message shortly after the call has been terminated and the new (current) credit is displayed in the idle mode display as seen in the display 62.

Figure 7:
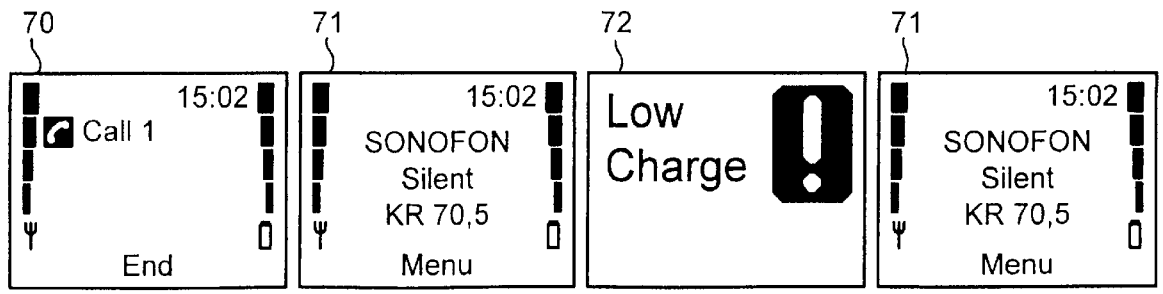
FIG. 7 shows four images illustrating a "low charge" scenario of the prepaid credit displayed according to the invention.

FIG. 7 is actually a continuation of the scenario in FIG. 6 because the operator has a possibility to set a low charge limit, e.g. 75.00 dkr and when the account becomes under this limit the user is warned as shown in display 72 of FIG. 7.

The message sent in the FIG. 7 scenario is a warning message indicating that the subscriber credit is below the predetermined limit. However this message includes the periodically updated information sent upon call termination.

The reception of the warning message will initiate the showing of updated current credit in the idle mode display 71. However the warning due to the low credit will initiate two time outs where the display 72 will be displayed a few second later (the first time out) and will remain on the display for e.g. 3–5 seconds (the second time out). The occurrence of the warning display will be accompanied by an alert signal from the buzzer or the vibrator of the phone (none of these are shown but both will be well known for a man skilled in the art). After the run out of the second time out the idle mode display 71 will appear again. However when terminating the call during low charge the scenario of FIG. 7 will be repeated. The user can make calls as long as the account is in cr edit.

Figure 8:
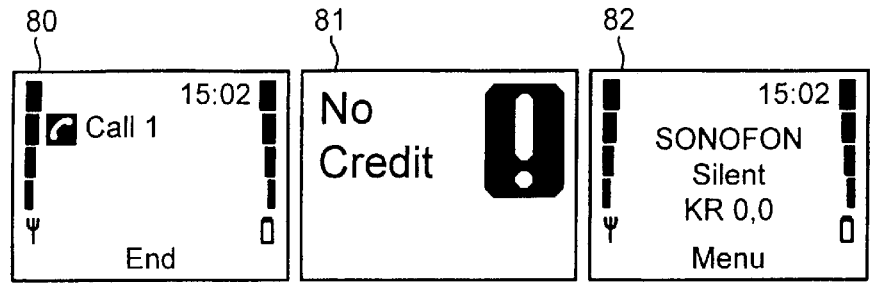
FIG. 8 shows three images illustrating a "no credit" scenario of the prepaid credit displayed according to the invention.

FIG. 8 illustrates a scenario according to which the network terminates a call (display 80) because there is no longer a positive credit on the account. A No Credit message is received and this initiates a time out (e.g. 3–5 seconds) during which the display 81 ("No Credit" explanation) indicates the lacking credit. After this the idle mode display 82 will inform the user about the "0,0" credit level. When the credit has run out only incoming calls and emergency calls are allowed.

Figure 9:
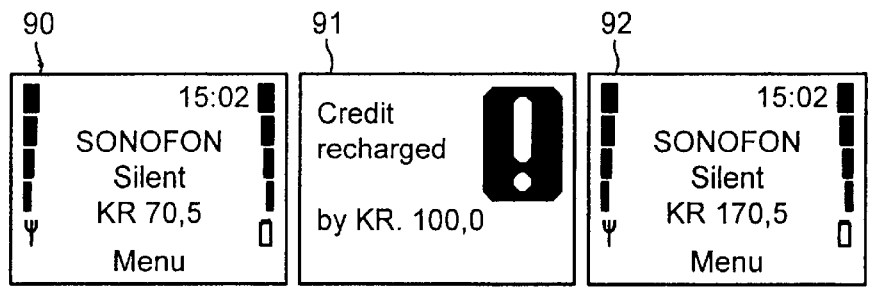
FIG. 9 shows three images illustrating a "credit recharged" scenario of the prepaid credit displayed according to the invention.

FIG. 9 shows a scenario in which the display 90 corresponds to the display 73 in the low charge scenario. The user adds 100 DKr to his account, e.g. via an internet-based money transfer, or by transmitting a code obtained from a recharge card. This causes a credit recharged message initiating a time out during which the user is informed in the display 91 that the account has been recharged with 100 DKr. After the time out the e up-dated current credit is shown in the idle mode display 92. Upon the occurrence of the recharging information in the display 91 the phone outputs an alert signal.

Figure 10:
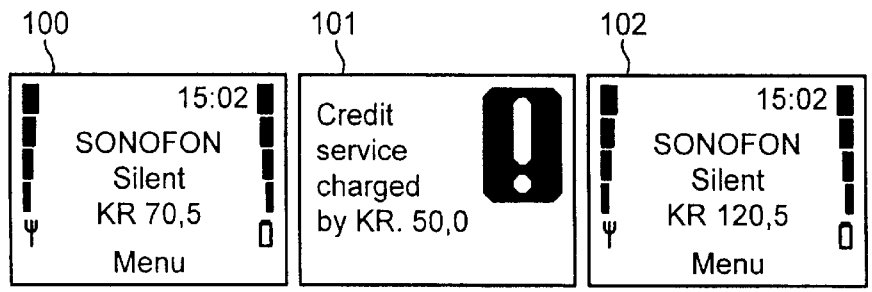
FIG. 10 shows three images illustrating a "credit service charged" scenario of the prepaid credit displayed according to the invention.

The FIG. 10 scenario shows that a special service has been charged. This service can be a software download, e.g. some graphic animation for the display. The display 10 corresponds to the display 92 in the recharge scenario. When the phone receives a "credit service charged" message this causes the initiation of a time out. During the time out the display 101 informs the user that the account has been charged with 50 DKr due to a credit service charge. The new current credit is shown in the idle mode second display 102. Upon the occurrence of the charging information in the display 101 the phone outputs an alert signal.

Preferably during the 3–5 seconds time out after the alert signal has indicated a special event causing a current credit update the processor 18 disables the phone keypad.

What is claimed is:

1. A portable prepaid phone having a display, input means for inputting information and instructions, a control unit controlling the display in dependence on the operation of the input means, and transceiver means communicating via a wireless network controlled by a network operator, said network operator manages an account for said phone and updates the account upon the occurrence of a credit affecting event, and said network operator forwards a credit update message to the portable prepaid phone and said message contains information about the current account and the credit affecting event causing the message to be sent to the phone upon the occurrence of a credit affecting event; wherein:

said transceiver means of the portable prepaid phone receives the credit update message;

said control unit decodes the received message in order to identify the content of the credit update message;

said control unit initiates the state of the current account in the display and automatically displays information about the event causing the credit update for a predetermined period of time upon the reception of the credit update message immediately after the termination of the credit update message decoding;

said credit affecting event is the termination of a phone call during which the current credit has passed below a predetermined credit level; and said display of credit update information contains displaying of a warning about the low credit level during a predetermined period of time, and subsequently displaying of the current credit in the idle mode display.

2. A phone according to claim 1, wherein said control unit disables the input means during said predetermined period of time.

3. A phone according to claim 1, wherein said control unit controls an alert signal means to issue an alert signal for marking the beginning of said predetermined period of time.

4. A phone according to claim 1, wherein the credit affecting event is connection to the network when the phone is switched on, and wherein the display of credit update information contains the current credit displayed in the idle mode display.

5. A phone according to claim 1, wherein the credit affecting event is the termination of a phone call, and wherein the display of credit update information contains the current credit displayed in the idle mode display.

6. A phone according to claim 1, wherein the processor activates an alert signal means when initializing the predetermined period of time.

7. A phone according to claim 1, wherein the processor stores all credit information received in credit information messages in a log file.

8. A portable prepaid phone having a display, input means for inputting information and instructions, a control unit controlling the display in dependence on the operation of the input means, and transceiver means communicating via a wireless network controlled by a network operator, said network operator manages an account for said phone and updates the account upon the occurrence of a credit affecting event, and said network operator forwards a credit update message to the portable prepaid phone and said message contains information about the current account and the credit affecting event causing the message to be sent to the phone upon the occurrence of a credit affecting event; wherein:

said transceiver means of the portable prepaid phone receives the credit update message;

said control unit decodes the received message in order to identify the content of the credit update message;

said control unit initiates the state of the current account in the display and automatically displays information about the event causing the credit update message immediately after the termination of the credit update message decoding;

said credit affecting event is the termination of a phone call by the network during call because there is no longer a positive credit on the account; and said display of credit update information contains displaying of an indication of the lacking credit during a predetermined period of time, and subsequently displaying of the current credit in the idle mode display.

9. A phone according to claim 8, wherein said control unit disables the input means during said predetermined period of time.

10. A phone according to claim 8, wherein said control unit controls an alert signal means to issue an alert signal for making the beginning of said predetermined period of time.

11. A phone according to claim 8, wherein the processor activates an alert signal means when initializing the predetermined period of time.

12. A phone according to claim 8, wherein the processor stores all credit information received in credit information messages in a log file.

13. A portable prepaid phone having a display, input means for inputting information and instructions, a control unit controlling the display in dependence on the operation of the input means, and transceiver means communicating via a wireless network controlled by a network operator, said network operator manages an account for said phone and updates the account upon the occurrence of a credit affecting event, and said network operator forwards a credit update message to the portable prepaid phone and said message contains information about the current account and the credit affecting event causing the message to be sent to the phone upon the occurrence of a credit affecting event; wherein:

said transceiver means of the portable prepaid phone receives the credit update message;

said control unit decodes the received message in order to identify the content of the credit update message;

said control unit initiates the state of the current account in the display and automatically displays information about the event causing the credit update for a predetermined period of time upon the reception of the credit update message immediately after the termination of the credit update message decoding;

said credit affecting event is a recharging of the account; and said display of credit update information contains display of information about the recharged amount during a predetermined period of time, and subsequently displaying of the current credit in the idle mode display.

14. A phone according to claim 13, wherein said control unit disables the input means during said predetermined period of time.

15. A phone according to claim 13, wherein said control unit controls an alert signal means to issue an alert signal for making the beginning of said predetermined period of time.

16. A phone according to claim 13, wherein the processor activates an alert signal means when initializing the predetermined period of time.

17. A phone according to claim 13, wherein the processor stores all credit information received in credit information messages in a log file.

18. A portable prepaid phone having a display, input means for inputting information and instructions, a control unit controlling the display in dependence on the operation of the input means, and transceiver means communicating via a wireless network controlled by a network operator, said network operator manages an account for said phone and updates the account upon the occurrence of a credit affecting event, and said network operator forwards a credit update message to the portable prepaid phone and said message contains information about the current account and the credit affecting event causing the message to be sent to the phone upon the occurrence of a credit affecting event; wherein:

said transceiver means of the portable prepaid phone receives the credit update message;

said control unit decodes the received message in order to identify the content of the credit update message;

said control unit initiates the state of the current account in the display and automatically displays information about the event causing the credit update for a predetermined period of time upon the reception of the credit update message immediately after the termination of the credit update message decoding;

said credit affecting event is charging of the account when the user of the account has requested a service by the network; and said display of credit update information contains displaying of information about the charged amount during a predetermined period of time, and subsequently displaying of the current credit in the idle mode display.

19. A phone according to claim 18, wherein said control unit disables the input means during said predetermined period of time.

20. A phone according to claim 18, wherein said control unit controls an alert signal means to issue an alert signal for making the beginning of said predetermined period of time.

21. A phone according to claim 18, wherein the processor activates an alert signal means when initializing the predetermined period of time.

22. A phone according to claim 18, wherein the processor stores all credit information received in credit information messages in a log file.

* * * * *